United States Patent [19]

Re

[11] 3,765,273
[45] Oct. 16, 1973

[54] VACUUM MODULATOR CONTROL FOR AUTOMATIC AUTOMOBILE TRANSMISSION
[75] Inventor: Ronald Re, Chester, Pa.
[73] Assignee: Re-Kase, Incorporated, Chester, Pa.
[22] Filed: Nov. 28, 1972
[21] Appl. No.: 310,013

[52] U.S. Cl. .............................................. 74/865
[51] Int. Cl. .......................................... B60k 21/00
[58] Field of Search ..................................... 74/865

[56] References Cited
UNITED STATES PATENTS
3,448,767  6/1969  Wonn ............................ 74/867 X
3,566,718  3/1971  Wightman ........................ 74/863
3,623,383  11/1971  Sheppard ....................... 74/865
3,631,744  1/1972  Blomquist ...................... 74/868
3,707,892  1/1973  Kuroda et al. .................. 74/860 X Primary Examiner—Arthur T. McKeon
Attorney—Earl L. Tyner

[57] ABSTRACT

A system for controlling the vacuum applied to the vacuum modulator valve in an automatic automobile transmission so that maximum security against clutch slippage will occur during acceleration, and ease of shifting to lower gear can occur during deceleration.

3 Claims, 3 Drawing Figures

VACUUM MODULATOR CONTROL FOR AUTOMATIC AUTOMOBILE TRANSMISSION

This invention relates to an improvement in automotive transmission systems having automatic shifting of gears, and more particularly, it relates to two-speed systems wherein the shifting is accomplished by hydraulic fluid pressure that is modulated by the action of the vacuum system of the automobile and the fluid pressure increases when the vacuum is broken. Still more particularly, this invention is applicable to the "Power Glide" transmissions of 1962-1972 Chevrolet automobiles.

In many modern automobiles which have an automatic transmission system for shifting gears the operation of the gear shifting mechanism is governed by hydraulic fluid, such as oil, under pressure. The speed of the car as it accelerates causes a change in the hydraulic fluid pressure which in turn shifts the gears from low to high. When the car decelerates the reverse action takes place and causes the gears to shift from high to low as the hydraulic fluid pressure changes in the opposite direction. Changes in the hydraulic fluid pressure are controlled by the vacuum system of the automobile which is the result of the normal operation of the intake manifold feeding the combustible mixture of fuel and air to the cylinders of the internal combustion engine. In general, vacuum is employed through a vacuum modulator valve which, in turn, permits more or less of the hydraulic fluid to by-pass the valve which regulates the pressure of the hydraulic fluid, and thereby causes the hydraulic fluid pressure to be decreased or increased as the vacuum is applied or shut off from the vacuum moudlator valve. In two-speed systems which are characterized by an increase in hydraulic fluid pressure when the vacuum to the vacuum modulator valve is cut off (this is particularly true of "Power Glide" transmissions in 1962-1972 Chevrolets), the vacuum control is less than completely satisfactory. When full hydraulic fluid pressure is applied, it causes the clutch which joins the gear to the power grain to effect a tight connection and to eliminate the possibility of slippage. On the other hand, when the pressure of the hydraulic fluid is fully applied, the downshifting of gears from high to low is accompanied by a sudden jarring movement of the clutch and a banging noise. A smooth down-shift occurs only when the hydraulic fluid pressure is low. The difficulty with the present system is that the change from high to low pressure on the hydraulic fluid system is not accomplished smoothly as the engine is accelerated or decelerated, because the vacuum system is not applied or shut off in a gradually changing manner. When the engine is accelerated, the vacuum is shut off from the vacuum modulator valve, causing the hydraulic fluid pressure to be at a high level, and when the car is decelerated, the vacuum is applied and the hydraulic fluid pressure is decreased.

It is an object of the present invention to control the vacuum which is applied to the vacuum modulator valve so as to provide a smooth shifting operation, particularly down-shifting, and at the same time have maximum protection against slippage of the clutches connecting the transmission gears to the power train of the automobile.

This invention is an improvement in a two-speed automatic transmission for automobiles in which a hydraulic fluid under pressure in a system of conduits, valves, and pressure regulating devices causes the transmission gears to shift from low to high to low in response to acceleration and deceleration of the automobile. The hydraulic fluid pressure is responsive to the intermittent application of vacuum through a vacuum modulator valve which functions by applying the vacuum when the engine is decelerated and by cutting off the vacuum as the engine is accelerated, the full pressure on the hydraulic fluid corresponding to no vacuum applied to the vacuum modulator valve. The improvement accomplished by this invention is a valve located in the vacuum line between the source of the vacuum and the vacuum modulator valve and being operatively connected to the throttle in such a fashion that as the throttle is advanced the valve closes the vacuum line and as the throttle is retarded the valve opens the vacuum line. This valve is of course adjustable so that any movement of the throttle is reflected with any desired precision in a movement of the vacuum control valve of this invention. A particularly desirable embodiment of the valve of this invention is a piston with a groove cut circumferentially around its surface to match an inlet and outlet port in the cylinder in which the piston operates. The piston is able to move axially to permit communication from the inlet to the outlet port along the groove in the piston at one location of the piston, or to cut off that communication at other locations of the piston. The movement of this piston is controlled by the movement of the rod or other means connecting the throttle to the carburetor of the engine.

This invention can be more fully understood by reference to the drawings accompanying this description.

Figure 1:
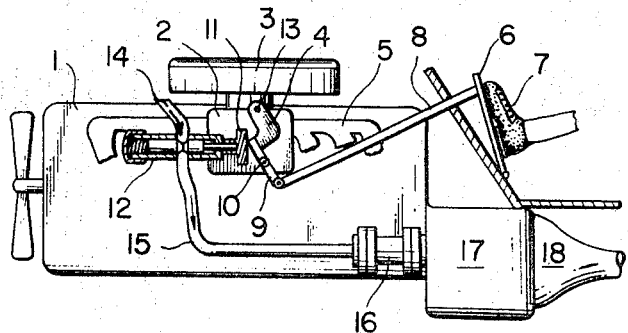
FIG. 1 is a schematic illustration of an automobile engine with the vacuum control valve of this invention connected to the throttle and to the transmission.

By specific reference to FIG. 1 the detailed operation of the invention can be more readily understood. An automobile engine (1) is shown schematically with those component parts which are of some importance in understanding the present invention. The carburetor (2) is shown with the conventional air filter (3) and with the fuel intake valve (4) for controlling the amount of fuel and air to the intake manifold (5) and thence to the cylinders for combustion. The amount of fuel introduced through valve (4) is controlled by a throttle which in this instance is shown as a foot accelerator (6) operated by the foot (7) of the driver of the automobile. The throttle is advanced by pressure on the accelerator pedal (6) which is transmitted through accelerator rod (8) to lever (9) which runs around pivot (10) permitting striker plate (11) of control valve (12) to more to the right. The movement of lever (9) also causes the arm of carburetor inlet valve (4) to turn about pivot (13) which opens or closes the valve admitting more or less fuel to the cylinders for acceleration or deceleration of the engine. The movement of vacuum control valve (12) permits vacuum to be applied or not applid to the component parts of the transmission (17). A vacuum source (not shown), which in most automobile systems derives it power from the function of the intake manifold (5), is connected through line (14) to vacuum control valve (12). When vacuum control valve (12) is in the open position, it permits the vacuum to be communicated from line (14) to line (15) and thence to vacuum modulator valve (16). When vacuum control valve (12) is in the closed position, vacuum in line (14) is not communicated to line (15) and therefore is not applied to the vacuum modulator valve (16). The action of vacuum mdoulator valve (16) causes changes in the hydraulic fluid pressure which is employed in transmission (17) to cause the shifting of gears from low to high to low as the engine is accelerated and decelerated. The power from the transmission is applied to the drive shaft (18) which is connected in the conventional fashion through a differential (not shown) to the rear wheels of the automobile (not shown).

Figure 2:
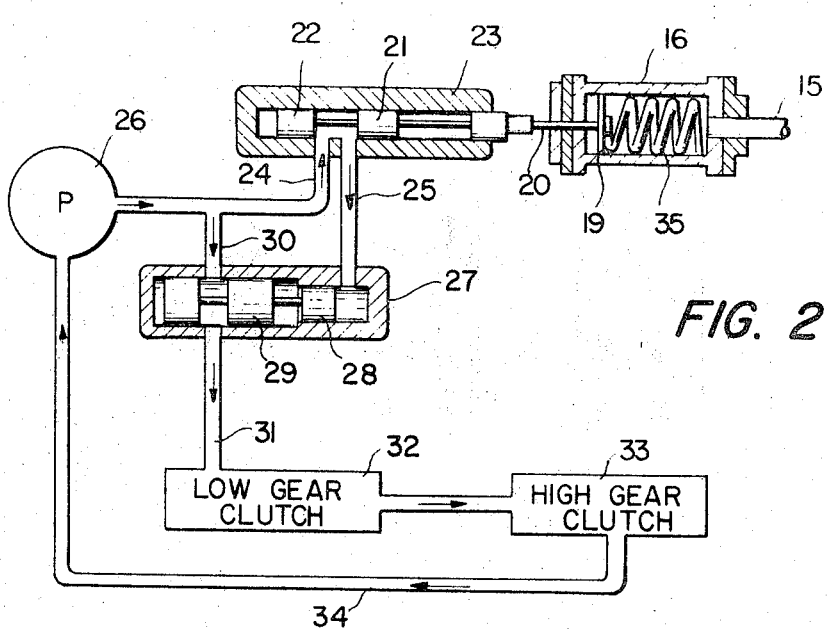
FIG. 2 is a schematic illustration of the principal components of the hydraulic fluid system controlling the shifting of transmission gears.

FIG. 2 is a simplified schematic illustration showing the general function and operation of the vacuum modulator valve (16) and its effect on the hydraulic fluid pressure which controls the operation of the shifting of gears in the transmission. It is not intended that this illustration be accurate in detail since many component parts and devices found in a modern automobile transmission system are not shown in this drawing. It is merely the purpose of this drawing to show, in a general way, how the vacuum system of an automobile is employed to control the pressure on the hydraulic fluid. In the normal operation of an automobile equipped with an automatic transmission system controlled by hydraulic fluid pressure, which is adjusted by means of the action of a vacuum modulator valve (16), the acceleration of the engine causes to vacuum to be shut off from the vacuum modulator valve (16) and contrariwise deceleration of the engine causes the vacuum to be applied to the vacuum modulator valve (16). As shown in FIG. 2 the application of vacuum to vacuum modulator valve (16) occurs through line (15) causing piston (19) to move to the right. This movement is transmitted to shaft (20) and to piston heads (21) and (22) which are fixed to shaft (20) in cylinder (23). This movement opens line (25) so that hydrauic fluid in line (24) can be transmitted from pump (26) to the booster valve portion of pressure regulator (27). The pressure of the hydraulic fluid from line (25) acting on piston (28) is to move piston (29) to the left and restrict the flow of hydraulic fluid from line (30) to line (31) and thereby to reduce the pressure to be applied to the low clutch (32) in the transmission. This permits the downshifting of the gears from high to low.

When the automobile engine is accelerated, vacuum through line (15) is shut off permitting the force of spring (35) to push shaft (20) and piston (21) to the left and thereby close line (25). This permits the full pressure of hydraulic fluid from pump (26) to pass through line (30) and to line (31) and thence to low clutch (32) and on to high clutch (33) causing the gears to shift into high. Hydraulic fluid from high clutch (33) is connected to pump (26) through line (34) to complete the circuit.

The problem with the operation of the present day automobiles is that when the car is decelerated and the vacuum is applied to vacuum modulator valve (16), the pressure on the hydraulic fluid in line (31) changes so quickly that the down-shifting from high gear to low gear is accomplished too suddenly, causing the gear clutches to move into place with a slamming movment. By incorporating the vacuum control valve of this invention the application of the vacuum is controlled so that such a slamming movement of the clutches is eliminated.

Figure 3:
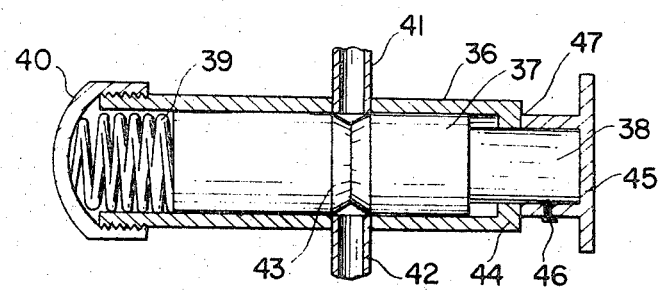
FIG. 3 is a sectional view of the vacuum control valve of this invention.

In FIG. 3 the working parts of the vacuum control valve (12) of this invention may be seen in detail. The valve comprises a cylinder (36) and a close fitting piston (37) inside cylinder (36). Piston (37) is able to move axially (to the right or to the left in this drawing) in accordance with force applied through shank (38) or by spring (39). The end of cylinder (36) is closed by means of a cap (40). Shank (38) is attached by any convenient adjustable means to lever (10) shown in FIG. 1. Cylinder (36) has a vacuum inlet port (41) and a vacuum outlet port (42) communicating through the wall of cylinder (36) in substantially the same plane at right angles to the axis of cylinder (36). These ports are made in a tubular configuration so that flexible hoses may be attached to conduct the vacuum to other locations, e.g. lines (14) and lines (15) in FIG. 1. Cylinder (37) is machined to produce a circumferential groove (43) which is able to function cooperatiely with inlet port (41) and outlet (42) as a valve. It may be seen that movement of piston (37) to the right or to the left reduces the opening available to vacuum communicating between ports (41) and (42), and eventually cuts off all communication between those ports, thus providing the familiar action of a valve in opening and closing a particular line.

An especially desirable means for contact between lever (10) of FIG. 1 and shank (38) is shown in FIG. 3. Cylinder (36) is provided with shoulder (44) which has an internal diameter which provides a sliding fit to shank (38) and provides a stop to movement of piston (37) to the right. Striker plate (45) fits snugly over the end of shank (38) and is affixed to shank (38) by set screw (46). The skirt portion of striker plate (45) is sufficiently long and thick to provide a positive stop for movement of shank (38) to the left by abutting onto the outer surface of shoulder (44) as shown at (47). The outer surface of striker plate (45) provides a large surface for contact with lever (9) of FIG. 1. The skirt portion of striker plate (45) is adjusted with respect to shank (38) such that when it is in contact with shoulder (44) at (47) groove (43) is in alignment with inlet port (41) and outlet port (42). In other words when the component parts of the valve of FIG. 3 are in proper adjustment, the valve is fully open when piston (37) is moved as far to the left as possible and the valve is fully closed when piston (37) is moved as far to the right as possible.

In the preferred embodiment of the vacuum control valve of this invention, when employed for a standard sized automobile, cylinder (36) can be made of ordinary three-eights inch metallic pipe approximately 4 ½ inches long. Inlet and outlet ports (41) and (42) can be one-eighth inch metal tubing approximtaely 1 inch long, welded in place. Piston (37) is of a suitable size to fit inside of cylinder (36) with a sliding fit with shank portion (38) of approximately five-sixteenths inch diameter and may be made of any of a variety of materials, although plastic is preferred. A suitable plastic is polyethylene polytetrafluoroethylene, polyacetal, polycarbonate, polypropylene, and other tough, solid plastic materials with low coefficients of friction. Groove (43) can be cut in any shape (i.e. V-shape, as shown, semicircular, rectangular, etc.) but preferably is approximately one-fourth inch wide and approximately one-eighth inch deep. A suitable spring (39) can be chosen with sufficient force to take up any play in the linkage connecting the accelerator (6) with piston (37) of the vacuum control valve (13). Cap (40) can be a threaded cap to fit the piping employed for cylinder (36). Striker plate is preferably three-fourth inch in diameter with a skirt portion of suitable size to fit shank (38).

In the operation of this invention the driver of an automobile applies foot pressure to accelerator (6), which, by means of various mechanical linkages, opens carburetor valve (4) to permit a larger volume of fuel to enter intake manifold (5) and thence to the cylinders in order to increase the engine speed. Similarly, when the operator of the automobile wishes to slow down, he releases pressure on accelerator (6) and the system of mechanial linkages causes valve (4) to close, reducing the amount of fuel to the cylinders and thereby decelerating the engine. The movement of the mechanical linkage between accelerator (6) and carburetor valve (4) is employed to move piston (37) to the right or left inside of cylinder (36), which in turn, closes or opens the vacuum line from its source to be applied through line (14) and line (15) to vacuum modulator valve (16). The exact position of piston (37) within cylinder (36) is adjusted by positioning striker plate (45) on shank (38) such that when the engine is idling piston (37) has moved as far as possible to the left and groove (43) is in line with inlet port (41) and outlet port (42), permitting a full application of vacuum to vacuum modulator valve (16). When the car is accelerated, piston (37) will be moved to the right and will gradually close the communication between inlet port (41) and outlet port (42) until the vacuum is completely shut off to vacuum modulator valve (16). As the car is accelerated the automatic transmission will shift from low gear to high gear in its normal operation, and this is accomplished when the maximum hydraulic fluid pressure is applied to the clutches causing them to shift from low to high and to be held in this high position without slippage. As the car is decelerated the vacuum is gradually applied, which in turn, causes the hydraulic fluid pressure to be decreased, and when the proper speed is reached as determind by the mechanism of the transmission of the automobile, the gears will shift from high to low smoothly and without any sudden movement or slamming vibration or noise.

Although the invention has been described in considerable detail with reference to certain preferred embodiments thereof, it will be understood that variations and modifications can be effected within the spirit and scope of the invention as described hereinabove and as defined in the appended claims.

What is claimed is:

1. In a two-speed automatic transmission for automobiles in which a hydraulic fluid under pressure in a system of conduits, valves, and pressure regulating devices causes the transmission gears to shift from low to high to low in response to acceleration and deceleration of the automobile, wherein the pressure of the hydraulic fluid is responsive to the intermittent application of vacuum through a vacuum modulator valve, whereby during acceleration of the automobile vacuum is not applied permitting full pressure of the hydraulic fluid to be applied to the clutch connecting the gear to the drive shaft of the automobile, and alternatively, during deceleration of the car vacuum is applied causing a lower pressure on the hydraulic fluid which in turn permits automatic shifting to a lower gear; the improvement which comprises a valve located in the vacuum line between the vacuum source and the vacuum modulator valve operatively connected to the throttle in such a fashion that as the throttle is advanced the said valve gradually closes the vacuum line and as the throttle is retarded said valve gradually opens the vacuum line.

2. The transmission system of claim 1 wherein said valve comprises a piston and a cylinder operatively connected so as to permit axial movement of the piston in the cylinder, inlet and outlet vacuum ports through the wall of said cylinder in the same radial plane, and a circumferential groove around said piston such that said ports communicate with each other via said groove at one axial position of said piston and do not communicate with each other when said piston is moved to another axial position.

3. The system of claim 2 wherein said cylinder has a closed end containing a spring applying force against one end of said piston, and the other end of said piston is fitted with a striker plate adjustable axially and provided with stop means whereby movement of the piston against said spring is stopped at the point where said groove is aligned with said inlet and outlet vacuum ports.

* * * * *